Aug. 13, 1946.   L. H. HEIGHT   2,405,651
RETRACTABLE LANDING GEAR
Filed Oct. 1, 1941   3 Sheets-Sheet 3

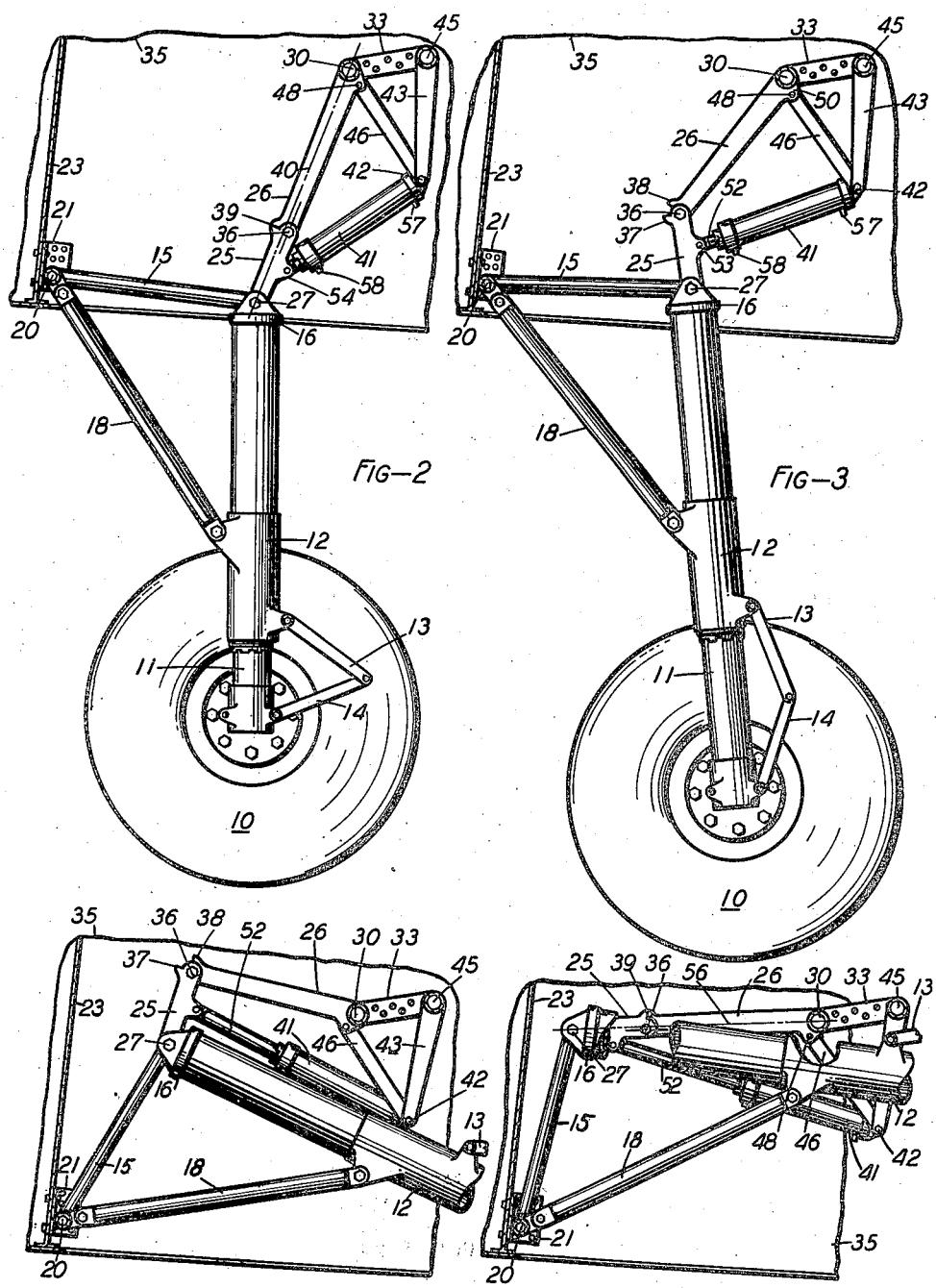

INVENTOR
Lewis H. Height

Patented Aug. 13, 1946

2,405,651

UNITED STATES PATENT OFFICE 2,405,651

RETRACTABLE LANDING GEAR

Lewis H. Height, Eagle Rock, Calif., assignor, by mesne assignments, to Lockheed Aircraft Corporation, a corporation of California Application October 1, 1941, Serial No. 413,096

7 Claims. (Cl. 244—102)

This invention relates to under carriages for aircraft and particularly to retractable landing gear for airplanes.

An object of this invention is to provide a landing gear of simplified construction embodying a number of inherent safety features and adapted to be retracted into the lower part of an airplane fuselage, engine nacelle or wing.

A further object of this invention is to provide a retractable landing gear which is automatically self-locking in either the fully extended or fully retracted positions without employing any secondary or auxiliary locking devices for this purpose.

A further object of this invention is to provide a retractable landing gear which is automatically self-locking in either the fully extended or fully retracted position and in which the locking action is effectively maintained independent of the retraction actuating system whereby inadvertent movement of the landing gear from such extreme positions upon failure of the said system is avoided.

Accordingly, the invention resides broadly in a retractable landing gear mechanism which is automatically self-locking in either the fully extended or fully retracted position. The invention further resides in retractable landing gear linkage mechanism which is inherently self-locking in either of said extreme positions without embodiment of extraneous control means or auxiliary apparatus or devices to effect such locking action.

Other objects and features of novelty will be apparent hereinafter.

In the drawings which by way of illustration show a preferred embodiment of the invention;

Figures 2 to 5 are side elevations of the apparatus of Figure 1 as located in a fragmentary longitudinal section of an airplane showing successive phases of the cycle of operation of the landing gear in which Figure 2 shows the landing gear fully extended and locked in the position for landing;

Figure 3 shows the position of the landing gear immediately following initiation of the retracting cycle;

Figure 4 shows the position of the landing gear near the completion of the retraction cycle; and Figure 5 shows the landing gear locked in a fully retracted position;

Figure 1:
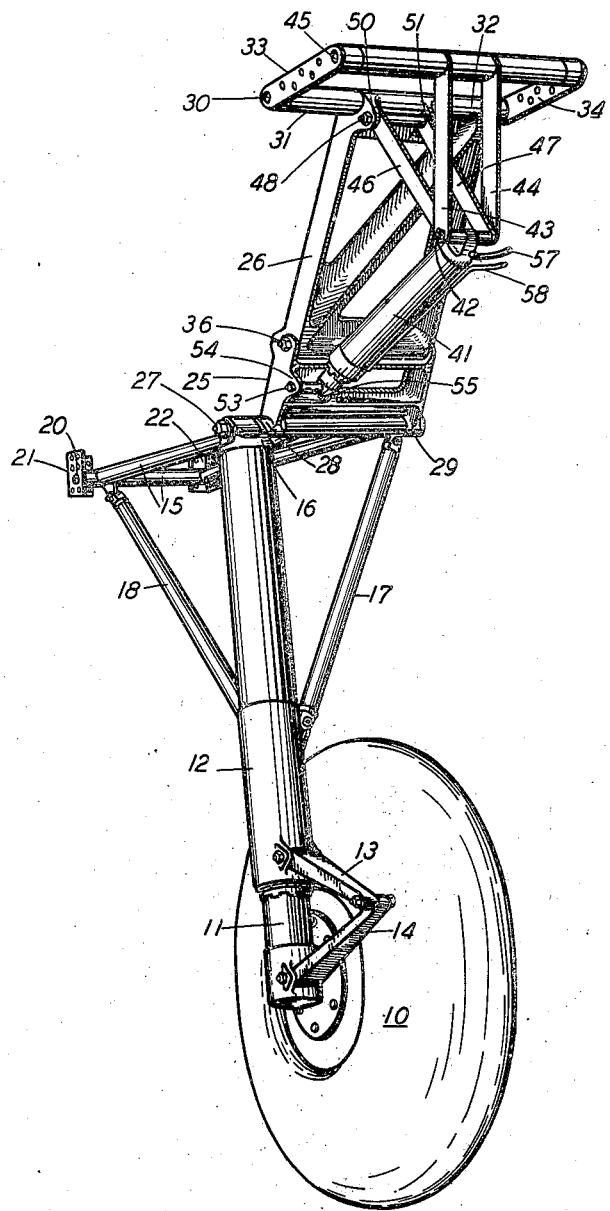
Figure 1 is a perspective view of the landing gear assembly.

Referring to Figures 1 to 5 of the drawings, throughout which the same reference numerals refer to the same parts, 10 is a landing gear wheel rotatably carried upon a suitably positioned axle at the lower end of the piston 11 of a conventional telescoping type of shock absorbing strut cylinder 12 which may be of the oleo-pneumatic type. Scissor type torque links 13 and 14 pivotally connected respectively to the cylinder 12 and piston 11 prevent rotation of the said piston with respect to the cylinder and thus serve to maintain running alignment of the landing wheel 10 with respect to the landing gear mechanism and the longitudinal axis of the airplane, while at the same time allowing cylinder 11 freedom to reciprocate axially within the said shock absorber cylinder 12.

The shock absorbing strut cylinder 12 is rigidly attached to a rectangular shaped trussed frame 15 by means of the head fitting 16 carried at the top end of the cylinder and also by a pair of diagonally positioned bracing columns 17 and 18 which extend from opposite corners of the rectangular truss 15 to bolted connection at the approximate mid-section of the shock absorber cylinder. The rigid structural unit composed of the truss frame 15, the shock absorber cylinder 12 and its bracing columns 17 and 18 is pivotally attached to the airplane structure by means of a shaft 20 which passes through the fittings 21 and 22 which in turn may be bolted, riveted, or otherwise fixed to any suitable structural element of the airplane, for example, the web of a wing beam 23.

A toggle linkage comprising a pair of interconnecting rectangular shaped link members 25 and 26 serve to move and support the before described landing gear structure in its various angular positions about the shaft 20 intermediate the extended and retracted positions. The lower toggle link member 25 is pivotally connected to the trussed frame 15 at its lower end by means of a shaft or bolt 27 which passes laterally through the end portion of the truss member and extends into the link bearings 28 and 29. The upper toggle link member 26 is pivotally supported at its upper end upon a shaft 30 which passes through the laterally extending tubular shaped members 31 and 32 of the said link 26 and extends into the fixed supporting fittings 33 and 34 which may be bolted or riveted to any suitable structural elements of the airplane, for example, the adjacent webs of a pair of wing ribs, one of which is shown in fragmentary view at 35 in Figures 2 to 5. The said links 25 and 26 are pivotally interconnected by means of a knee joint comprising a pin or bolt 36, and a pair of laterally extending restraining lugs 37 and 38 respectively positioned on the adjacent ends of said links and adapted to come into restraining contact with one another as shown at 39 in Figure 2 when the knee joint is rotated as shown with the pivot center of bolt 36 slightly to the right, as viewed in Figure 2, of the centerline 40 extending between the centers of pivot points 27 and 30.

A double acting hydraulic cylinder, by means of which the landing gear is actuated is shown at 41 and is pivotally supported at its head end on a pin connection 42 which passes through the lower ends of a pair of converging linkages, each comprising a pair of parallel links 43—44 and 46—47. Links 43—44 are supported at their upper ends for limited pivotal movement about a shaft 45 which also makes connection at its outer ends to the beforementioned fixed supporting fittings 33 and 34. The linkage comprising the pair of parallel links 46 and 47 makes pivotal connection at its upper end with a pin 48 which passes through a pair of bosses or levers 50 and 51 extending laterally from the upper end of the upper rectangular link 26 at a point adjacent the shaft 30.

The piston rod 52 which extends from the cylinder 41 makes pivotal connection at 53 with a pair of bosses 54—55 which extend laterally from the approximate mid-point of the lower rectangular toggle link 25.

Pipe connections 57 and 58 leading respectively to the head and piston ends of the cylinder 41 serve to transmit fluid pressure through suitable flexible connections from a suitable pressure source within the airplane to either side of the piston as desired, for actuating the landing gear mechanism.

The operation of the apparatus of Figures 1 to 5 is as follows:

For convenience the gear will be assumed to be initially in the locked-down position for landing as shown in Figure 2. In this locked-down position it is a particular feature of the invention that the supporting toggle links 25 and 26 are mutually pivoted about 36 to a position past the center line extending between pivots 27 and 30 in which position the adjacent faces of the restraining lugs 37 and 38 of the said respective interconnected links are brought into contact as shown at 39 in Figure 2 whereby further rotation of the links about center 36 and corresponding movement of center 36 past the centerline 40 is prevented. This is referred to herein as the self-locking or inherent locking feature. Upon landing the airplane whereby upward force, relative to the airplane, is applied to the under side of the landing wheel 10 and transmitted thence upward through the shock absorbing strut 12, the resultant counterclockwise rotational moment thus applied to the wheel supporting structure about center 20 will be resisted by compression set up in the locked toggle links 25 and 26. Since the links 25 and 26 are retained in a past center position by the restraining lugs 37 and 38 as just mentioned, the lateral component of said compression imposed upon them in the landing operations will serve only to tend to force the pivot point 36 to a position still further to the right beyond the centerline 40 which motion is resisted and prevented by the said restraining lugs 36 and 37. The inadvertent collapse of the landing gear during landing operations is thus obviated by this self-locking action.

The retraction of the landing gear from the fully extended position, shown in Figure 2, is initiated by transmitting suitable fluid pressure through pipe 58 to the head of the cylinder 41 which results in an outward movement of the piston rod 52 increasing the distance between the pivot points 42 and 53. Counterclockwise rotational movement about the center 27 is thus induced in the toggle link 25 resulting in its displacement to an initial position as shown in Figure 3 in which the toggle links 25 and 26 are moved out of and to the left of their past center locked position of Figure 2. The resulting shortening of the distance between the strut head pivot 27 and the fixed shaft connection 30 places sufficient tension in the toggle links 25 and 26 to lift and impose an initial retractive rotational moment upon the landing gear truss about the fixed pivot point 20.

Continued application of fluid pressure to the head of cylinder 41 and the resultant further extension of the piston rod 52 further continues to shorten the distance between the fixed shaft connection 30 and the pivot pin 27 until the truss 15 carrying the shock strut and the landing wheel are rotated upward about the fixed center 20 to a position where the pivot bearing 27 is on a straight line joining the fixed bearing points 20 and 30. At this point the centerlines of the toggle links 25 and 26 reach their approximate maximum angular displacement from alignment. From this point on, still further extension of the piston 52 causes the distance between pivot 27 and fixed bearing 30 to again lengthen, resulting in opening of the included angle between the links 25 and 26 about their common pivot center 36. Figure 4 shows such a position of the gear after the said angle between links 25 and 26 has begun to widen.

During the before described cycle of operation of the landing gear from the extended position of Figure 2 to that of the partially retracted position of Figure 4, the compressive force exerted by the cylinder 41 has resulted in a resultant tensile stress in the linkage 46—47. This tension acting at pivot 48 on the increasing projected lever arm formed between pivot point 48 and the center of bearing 30 has resulted in a proportionally increasing downward or counterclockwise rotational moment of the link 26 about the said bearing 30, partially opposing the upward rotation thereof during the aforesaid retraction cycle. This reactive rotational moment also opposes the counterclockwise rotation of link 25 until the link 25 and truss 15 are brought into near alignment or approximately into a common plane as shown in Figure 4, after which the beforementioned counterclockwise rotational moment applied to the link 26 by the tensile force applied at 48 assists the subsequent clockwise rotation of link 25 by inducing a toggle action to move links 25 and 26 down into a common plane. This rotative force continuing to act upon link 26 further forces the common pivot center 36 of links 25 and 26 to pass its dead center position as shown by centerline 56 extending between 27 and 30 until the adjacent faces of lugs 37 and 38 are again brought into locking contact as shown at 39 to restrain further angular displacement. At this point the landing gear is securely locked in its fully retracted position as shown in Figure 5, and the fluid pressure may then be released from the actuating cylinder head. The landing gear will then remain locked in its fully retracted position independent of any sustaining fluid pressure in the cylinder or other extraneous locking means.

To extend the landing gear from its retracted position as shown in Figure 5 to that of its fully extended position as shown in Figure 2, the before described cycle of operation is reversed. First the fluid pressure is admitted through pipe connection 57 to the piston rod end of the cylinder 45 which places the piston rod 52 and the cylinder 41 under tension between their pivot points 42 and 53. This tension results in a compressive force through link 38 which, acting at pinned connection 48 about the lever arm 48—28 tends to rotate link 26 upward in a clockwise direction about 30, past the dead center locked position for the toggle links 25—26 to some initial position such as that shown in Figure 4. From this position the landing gear acting under the combined fluid force applied through piston rod 52 and the weight of the shock strut and wheel, drops readily to the fully extended and locked position as shown in Figure 2.

When the links 25 and 26 are in the past center locked positions for either the fully extended or fully retracted positions as shown in Figures 2 and 5, all forces exerted by the landing gear are transmitted directly to the airplane structure at the fittings for the bearings 20 and 30. At either extreme position of the gear there need be no force exerted by the cylinder 41, nor any force in links 43 and 46 nor in the bearing 45.

The before described retractable mechanism is applicable to any of the landing wheels of either the conventional types or of the so-called tricycle types of landing gear.

Figure 6:
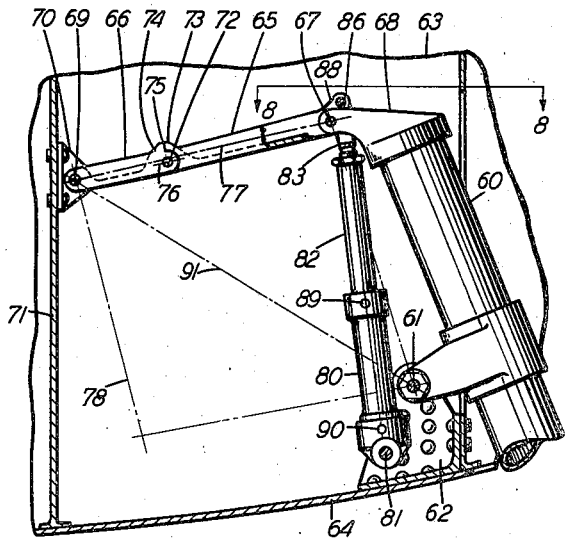
Figures 6 and 7 are side views of an optional form of landing gear structure respectively showing the landing gear fully extended and fully retracted.
Figure 8:
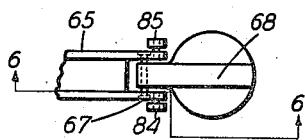
Figure 8 is a fragmentary plan view of Figure 6 taken approximately at line 8—8.
Figure 7:
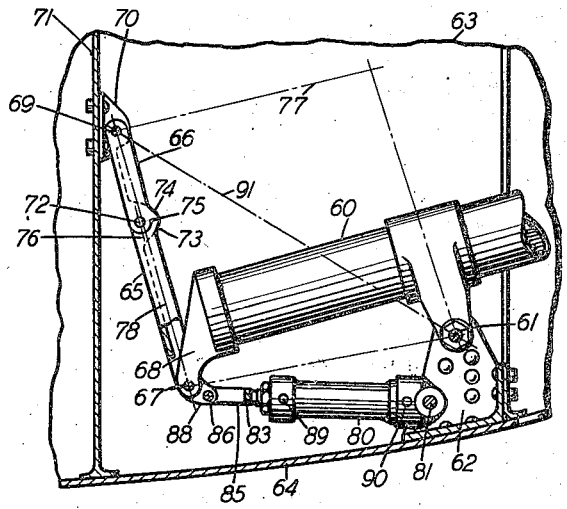

Referring now to Figures 6 to 8 throughout which the same reference numerals refer to the same parts, 60 is the cylinder of a shock absorbing strut which may be of the conventional oleo-pneumatic type and similar to that shown at 12 in Figures 1 to 5. The said cylinder 60 of the shock absorbing strut is pivotally attached to the airplane structure by means of a shaft or pin 61 which passes through fitting 62 which in turn may be bolted, riveted or otherwise fixed to any suitable structural element or member of the airplane as, for example, the web and skin 63 and 64 of the wing or of skin 64 of the fuselage.

A toggle linkage comprising a pair of interconnecting channel sectioned link members 65 and 66 serve to support and lock the landing gear structure including the before mentioned shock cylinder 60 in either of its extreme angular positions about pivot 61 corresponding to the fully extended position of Figure 6 and the fully retracted position of Figure 7. The outer toggle link member 65 is pivotally connected at 67 to the head 68 of the cylinder 60. The inner toggle link member 66 is pivotally connected at 69 to a fitting 70 which may be bolted or riveted or otherwise suitably fixed to any suitable structural member of the airplane, for example an adjacent beam or bulkhead 71. The said links 65 and 66 are pivotally interconnected by means of a knee joint comprising a pin 72, and a pair of laterally extending restraining lugs 73 and 74 respectively positioned on the adjacent ends of said links. These restraining lugs are adapted to come into restraining contact with one another at their mutual contact line 75 when the knee joint is rotated to a position with the centerline 76 of the pivot connection 72 slightly beyond the centerline as shown at 77 in Figure 6 and also slightly beyond the centerline as shown at 78 in Figure 7 which extends in both cases between the centers of the pivots 67 and 69.

A double acting hydraulic cylinder 80, by means of which the landing gear is actuated is pivotally supported at its head end on a pin connection 81 which passes through the before mentioned fixed fitting 62.

The piston rod 82 which extends from the cylinder 80 and which terminates at its outer end in a forked connection 83 having parallel connecting members 84 and 85, makes pivotal connection at 86 with a lever 88 which is formed by an angular extension of the link 65 beyond pivot 67.

Pipe connections 89 and 90 leading respectively to the head and piston ends of the cylinder 80 serve to transmit fluid pressure through suitable flexible connections from a suitable pressure source within the airplane to either side of the piston as desired for actuating the landing gear retracting mechanism.

The operation of the apparatus of Figures 6 to 8 is as follows:

For convenience the landing gear will be assumed to be initially in the locked-down position for landing, as shown in Figure 6. In this locked-down position it is a particular feature of the invention that the supporting toggle links 65 and 66 are mutually pivoted about the center 72 to a position as indicated at 76 which is past the centerline extending between the centers of the outer link pivots 67 and 69, in which position the adjacent faces of the restraining lugs 73 and 74 of the said respective interconnected links are brought into contact with one another as shown at 75, whereby further rotation of the links about center 72 and corresponding movement of the center 72 past the centerline 77 is prevented. This mechanical arrangement is referred to herein as the self-locking or inherent locking feature. When the airplane is on the ground or upon landing the airplane, whereby upward force relative to the airplane is applied to the under-side of the landing wheel and is transmitted thence upward through the shock absorbing strut cylinder 60, the resultant counter-clockwise rotational moment thus applied to the wheel supporting structure about the pivotal support 61 will be resisted by compressive force set up in the locked toggle links 65 and 66. Since the links 65 and 66 are retained in a past dead center position by the restraining lugs 73 and 74, as before mentioned, the lateral component of said compressive force thus imposed upon them by reason of the past dead center position of the pivot 72 will serve only to tend to force the said pivot point 72 to a position still further below the centerline 77, as viewed in Figure 6. The inadvertent collapse of the landing gear during landing operations is thus obviated by this self-locking action.

The retraction of the landing gear from the fully extended position, shown in Figure 6, is initiated by transmitting suitable fluid pressure through pipe 89 to the piston rod end of the cylinder 80 which results in an inward movement of the piston rod 82 decreasing the distance between the pivot points 86 and 90. Clockwise rotational moment and movement about the center 67 is thus induced in the angular lever 88 which simultaneously results in a clockwise rotational movement of the toggle link 65 about the said center 67. This results in braking the locked position of the knee joint and in raising the center of the pivot 72 from the position as shown at 76 to a position above the centerline 77. The resultant shortening of the distance between the shock strut head pivot 67 and the fixed pivot 69 and also the rotational moment applied at the shock cylinder head pivot 67 by the tension induced in the piston rod 82 results in a counter-clockwise retractive rotational moment upon the landing gear strut about the said fixed pivotal support 61.

Continued application of fluid pressure to the piston rod end of cylinder 80 and the resultant inward motion of the piston rod 82 further continues to shorten the distance between the fixed pivot 81 and the pivot 86 until the shock strut cylinder 60 is rotated counter-clockwise about the fixed pivot 61 to a position as shown in Figure 7 where the toggle links 65 and 66 are again brought into a position of alignment upon centerline 78. At this point this rotative force of the piston 82 continuing to act upon the lever 88 forces the common pivot point 72 of the links 65 and 66 to pass beyond the dead center position as shown at 76 where the adjacent faces of the restraining lugs 73 and 74 are again brought into locking contact with one another as shown at 75 to restrain further angular displacement. At this point the landing gear is securely locked in its fully retracted position as shown in Figure 7 and the fluid pressure may then be released upon the actuating cylinder head. The landing gear will then remain locked in its fully retracted position independent of any sustaining fluid pressure in the cylinder or other extraneous locking means.

To extend the landing gear from its retracted position as shown in Figure 7 to that of its fully extended position as shown in Figure 6, the before described cycle of operation is reversed. First the fluid pressure is admitted through pipe connection 90 to the head end of the cylinder 80 which places the piston rod 82 and the cylinder 80 under compression between their pivot points 81 and 86. This compression results in a clockwise rotational moment being applied to the lever 88 sufficient to rotate the toggle link 65 in a clockwise direction about the said pivot 67, braking the locked knee joint of the toggle linkage and bringing the centerline 76 of the pivot 72 to an initial position to the right of the centerline 78. From this position the landing gear actuated by the combined fluid force applied through the piston rod 82 and the weight of the shock strut cylinder and wheel, drops readily to the fully extended and locked position in Figure 6.

At either extreme position of the landing gear there need be no force exerted by the cylinder 80 nor any force upon the pivots 89 or 86.

It is to be noted that the centerline 91 extending between the two fixed pivots 61 and 69 bisects the angle between the centerlines 77 and 78 which correspond to the positions of the toggle linkage at the fully extended and fully retracted positions of the landing gear. It is also to be noted that the force exerted by the piston rod 82 upon the lever 88 is always such that at either of the extreme positions of the landing gear the toggle linkage is forced into the locked position. Ordinarily the weight of the links in the toggle linkages are sufficient to retain them in the locked positions, however, in some cases where the airplane landing gear is subjected to extraneous forces due to rapid accelerations or vibrations, it may be necessary to incorporate a coiled spring device in the knee joint pivot 72 which acts to retain said linkages in their locked positions.

While for the purpose of convenience and illustration the retractable landing gear mechanism of this invention has been described as carrying the conventional type of landing wheel, it is to be understood that it is similarly applicable to other equivalent supporting devices such as skis or floats.

Instead of employing a hydraulic cylinder as illustrated herein to actuate the landing gear retracting mechanism other equivalent devices obviously may be employed for the purpose, such as, for example, a manually or electrically driven screw mechanism which may be adapted to change the length of a strut or other equivalent linkage which may be connected between the pivot points 42 and 53 of the apparatus of Figures 1 to 5 or likewise between pivot points 81 and 86 of the apparatus of Figures 6 to 8.

The foregoing description is not to be taken as limiting but is merely illustrative of a preferred embodiment and other variations and modifications are obviously possible within the scope of the claims.

I claim:

1. In a retractable landing gear for aircraft, apparatus comprising in combination, a landing wheel, a support for said wheel pivotally connected to a bearing fixed to said aircraft structure, and upon which said wheel and said support may be swung from an extended position, into said airplane structure to a retracted position, a toggle linkage pivotally connected at one end to an intermediate portion of said wheel support, and at the other end to a bearing fixed to said airplane structure, said toggle linkage including links having parts engageable one with the other to determine the opposite limits of motion of said wheel support from its fully extended to its fully retracted positions and to lock past dead center at either of the said extreme positions of said wheel support and means to apply force to said toggle linkage to vary the included angle between the toggle links about their common interconnecting knee joint, to actuate said locking action and to apply a rotational moment to said wheel support about its said pivoted connection to said airplane structure sufficient to swing said wheel and support from one of said limited extreme positions to the other.

2. In a retractable landing gear for aircraft, apparatus comprising in combination, a landing wheel, a support for said wheel pivotally connected to a bearing fixed to said aircraft structure, and upon which said wheel and said support may be swung from an extended position, into said airplane structure to a retracted position, a toggle linkage pivotally connected at one end to an intermediate portion of said wheel support, and at the other end to a bearing fixed to said airplane structure, said toggle linkage including links having parts engageable one with the other to determine the opposite limits of motion of said wheel support from its fully extended to its fully retracted positions and to lock past dead center at either of the said opposite extreme positions of said wheel support and means to apply force to said toggle linkage at a point intermediate its ends to vary the included angle between the toggle links, to actuate said locking action and to apply a rotational moment to said wheel support about its said pivoted connection to said airplane structure sufficient to swing said wheel and support from one of said limited extreme positions to the other.

3. In a retractable landing gear for aircraft, apparatus comprising in combination, a landing wheel, a support for said wheel pivotally connected to a bearing fixed to said aircraft structure, and upon which said wheel and said support may be swung from an extended position, into said airplane structure to a retracted position, a toggle linkage pivotally connected at one end to an intermediate portion of said wheel support, and at the other end to a bearing fixed to said airplane structure, said toggle linkage comprising a primary link and a secondary link pivotally interconnected end to end to form a knee joint, parts on the links engageable one with the other and arranged so as to determine the opposite limits of motion of said wheel support and to limit the relative angular rotation of said links about the knee joint in one direction to a position slightly past dead center alignment with respect to the longitudinal axes of said links whereby a substantially axial compressive force applied through said toggle linkage will cause said links to lock rigidly in said past dead center position, primary means to apply force laterally to said toggle linkage at a point intermediate its ends to vary the included angle between the said toggle links about the said knee joint and to apply a rotational moment to said connected wheel support about its pivoted connection to said airplane structure sufficient to swing said wheel and support from one of said limited extreme positions to the other, secondary means to apply lateral force to said toggle linkage intermediate its ends to partially oppose the effect of said primary force and to actuate said locking action of said toggle linkage at the said extreme positions of travel of said wheel support.

4. Apparatus according to claim 3 in which the said primary force applying means is pivotally linked to said secondary force applying means.

5. In a retractable landing gear for aircraft, apparatus comprising in combination, a toggle linkage for extending and retracting a landing wheel support, said linkage comprising one link having an end pivotally secured to a fixed part of the aircraft; and a second link having an end pivotally connected to said wheel support, the two links being pivotally interconnected end to end to form a knee joint, contacting means attached to said links to limit the relative angular rotation of said links about the said knee joint at the fully extended and fully retracted positions to a position slightly past dead center alignment with respect to the longitudinal axes of said links whereby a substantially axial compressive force applied through said toggle linkage will cause said links to lock rigidly in said past dead center position and means to actuate said toggle linkage to lock and unlock said wheel support in said extreme positions.

6. Retractable landing gear for aircraft comprising a landing wheel, a support for the wheel pivotally secured to the aircraft so that the wheel is movable between an extended position and a retracted position, toggle linkage pivotally connected between a fixed portion of the aircraft structure and an intermediate portion of said support, the linkage comprising a pair of links pivotally interconnected end to end to form a knee joint and parts on the links engageable one with the other to determine the opposite limits of movement of said support by limiting the relative movement of the links about the knee joint in one direction to stop the links in positions where the knee joint is slightly beyond dead center alignment relative to the longitudinal axes of the links whereby an axial compressive force applied to the linkage will lock the linkage in past dead center position, and means for applying force to the toggle linkage at a point intermediate its ends to vary the included angle between said links to cause said locking action and to move said wheel support between its extended and retracted positions.

7. Retractable landing gear for aircraft comprising a landing wheel, a support for the wheel pivotally secured to the aircraft so that the wheel is movable between an extended position and a retracted position, toggle linkage pivotally connected between a fixed portion of the aircraft structure and an intermediate portion of said support, the linkage comprising a pair of links pivotally interconnected end to end to form a knee joint, stop lugs on the adjacent end portions of links engageable one with the other to limit relative movement of the links about the axis of said joint and thus stop the links in positions where the knee joint is past dead center alignment relative to the longitudinal axes of the links so that an axial compressive force applied to the linkage will lock the linkage in the past center position, said stop lugs being engageable to determine the opposite limits of movement of said wheel support, and means for acting on said linkage to vary the included angle between said links and thus produce movement of said wheel support between its extended and retracted positions and to cause said locking action.

LEWIS H. HEIGHT.